United States Patent [19]

Kanai et al.

[11] Patent Number: 5,323,282
[45] Date of Patent: Jun. 21, 1994

[54] THIN-FILM MAGNETIC HEAD

[75] Inventors: Kunio Kanai, Saitama; Yukio Ohta, Tochigi, both of Japan

[73] Assignee: Hitachi Metals, Ltd., Tokyo, Japan

[21] Appl. No.: 1,780

[22] Filed: Jan. 8, 1993

[51] Int. Cl.⁵ .......................... G11B 5/48; G11B 5/60
[52] U.S. Cl. .................................................... 360/103
[58] Field of Search ........................ 360/103, 102, 104

[56] References Cited

U.S. PATENT DOCUMENTS

| | | | |
|---|---|---|---|
| 4,430,440 | 2/1984 | Wada et al. | 501/105 |
| 4,796,127 | 1/1989 | Wada et al. | 360/103 |
| 4,859,638 | 8/1989 | Wada et al. | 501/58 |

FOREIGN PATENT DOCUMENTS

| | | |
|---|---|---|
| 1-251308 | 10/1989 | Japan . |
| 3-126662 | 5/1991 | Japan . |
| 3-127315 | 5/1991 | Japan . |

*Primary Examiner*—John H. Wolff

[57] ABSTRACT

A thin-film magnetic head has a slider formed of non-magnetic polycrystalline Mn—Zn ferrite containing from 0.02 to 7 wt % of at least one member selected from the group consisting of CaO, MgO, $ZrO_2$, $SnO_2$, $Al_2O_3$, SrO and NiO. Concave-convex surface having height difference is given to air bearings on a floatation surface side of the slider so that the convex portions occupy the area percentage in a range of from 20 to 80%.

3 Claims, 2 Drawing Sheets

THIN-FILM MAGNETIC HEAD

BACKGROUND OF THE INVENTION

The present invention relates to a thin-film magnetic head with superior CSS (contact, start and stop) characteristics, particularly for use in a small-sized high-density recording magnetic disk device.

Recording-reproducing floating type magnetic heads in magnetic devices are classified into three types, namely, a monolithic type in which the whole structure thereof is formed of soft-magnetic ferrite, a composite type in which, only for an electromagnetic transducer portion, a soft-magnetic Mn—Zn ferrite core or a magnetic head core with a metal magnetic thin film is produced and incorporated in a slider formed of a nonmagnetic material, and a thin-film type in which an electromagnetic transducer portion formed of a metal magnetic thin film is provided on a nonmagnetic substrate.

Composite type magnetic heads are mainly used as floating type magnetic heads for 3.5-inch or less than 3.5-inch high-density small magnetic disk devices. With the advance of increase of the recording density, there is a tendency to use more frequently thin-film type magnetic heads in which an electromagnetic transducer portion is formed on a nonmagnetic substrate by lithographic and thin-film techniques, and which have been heretofore mainly employed in large-sized devices.

The nonmagnetic slider used in thin-film type heads requires optimum relations in coefficient of thermal expansion from the double point of view of production and use because a metal magnetic film is formed on an $Al_2O_3$ film generally formed on a trailing edge of the slider. From such relations, a substrate material formed of alumina titanium carbide (ATC) as a main material is generally used for the slider.

In order to meet the recent advance of increase of the recording density in magnetic disk devices, hard disks of the type in which a magnetic substance is closely deposited onto a disk substrate through plating or sputtering, are used as magnetic recording media.

The surface of the disk produced through plating or sputtering as described above is finished up with flat and fine surface roughness compared with the conventional coating type disk and is overcoated with a lubricant. Accordingly, the sticking phenomenon which occurs in between the head and the disk surface has come up to a serious problem though it was a minor problem up to now. That is, as the surface roughness of the surface facing the magnetic recording medium becomes finer, there arises a phenomenon that the surface of the disk in a state of rest is stuck to the surface of the head facing the disk. When the adhesion between the head and the disk becomes intensive excessively, the adhesion exceeds motor torque for rotating the disk so that the device cannot operate easily. At the same time, the lifetime against CSS (contact, start, and stop) operations is shortened. In particular, in the case where a plurality of disks are used in combination, the problem becomes more serious.

In order to relieve the sticking phenomenon, various means for treating the surface of the head facing the disk to make it rough to some degree have been proposed.

As one of the means for solving the problem, Japanese Patent Unexamined Publication No. Hei. 1-251308 (U.S. Pat. No. 5,010,429) discloses a floating type magnetic head formed of a polycrystalline material, in which air bearing surfaces as surfaces facing a magnetic recording medium are formed with convex-concave surface having height difference of 50 to 200 Å on an average and repetition pitch of convex and concave of 5 to 20 μm on an average, and the portions, in which the heights of convex and concave abruptly change, extend along the grain boundaries of the polycrystals. FIG. 4 is a perspective view of a monolithic type magnetic head as an example thereof.

The monolithic type magnetic head is, however, not suitable for magnetic disk devices requiring higher-density recording in the future because the whole structure is formed of a soft-magnetic material so that this type magnetic head has disadvantages, for example, in that the inductance (L) of the head is large, therefore, it makes the high-frequency response poor and thereby produce noise easily.

FIG. 5 is a perspective view showing an example of the thin-film type magnetic head. The reference numeral 10' designates a magnetic head, 11' air bearings, 12' an electromagnetic transducer portion and 13' a slider. Alumina titanium carbide used in a substrate constituting the slider of the thin-film head, is a material in which a problem may be caused by a lubricant of the disk as a recording medium because titanium carbide is active and in which another problem may be caused in workability because it has high hardness with the Vickers hardness of about 2,000 Kg/mm$^2$. Furthermore, it is difficult to form suitable concave-convex level differences in the surface of the head facing the magnetic recording medium. Accordingly, in particular, the CSS characteristic becomes a problem in the floating type magnetic head requiring the flying height of less than or equal to 0.1 μm with the advance of reduction in size and increase in recording density.

The inventors of the present invention have disclosed nonmagnetic Mn—Zn ferrite for a magnetic head in Japanese Patent Unexamined Publication No. Hei-3-126662 and have further disclosed a composite type floating type magnetic head having a slider formed of nonmagnetic Mn—Zn ferrite in Japanese Patent Unexamined Publication No. Hei-3-127315.

The inventors of the present invention have made further researches and, as a result, have made it possible to provide a thin-film magnetic head in which suitable concave-convex surface having height difference is given onto air bearing surfaces by using nonmagnetic Mn—Zn polycrystalline ferrite to approximate the coefficient of thermal expansion thereof to the coefficient of thermal expansion of the $Al_2O_3$ film formed between the slider and the metal magnetic film to thereby attain good CSS characteristic and avoid separation of the metal magnetic film.

SUMMARY OF THE INVENTION

The thin-film magnetic head according the present invention is a head in which concave-convex surface having height difference is given onto air bearings on a floatation surface side of a slider formed of nonmagnetic polycrystalline Mn—Zn ferrite containing from 0.02 to 7 wt % of at least one member selected from the group of CaO, MgO, $ZrO_2$, $SnO_2$, $Al_2O_3$, SrO and NiO in a composition having one of proportions parenthethized in A-B-C-D-E-F A ($Fe_2O_3$: 20, MnO: 34, ZnO: 46)
B ($Fe_2O_3$: 20, MnO: 40, ZnO: 40)
C ($Fe_2O_3$: 30, MnO: 40, ZnO: 30)

D ($Fe_2O_3$: 45, MnO: 25, ZnO: 30)
E ($Fe_2O_3$: 58, MnO: 4, ZnO: 38)
F ($Fe_2O_3$: 50, MnO: 4, ZnO: 46) by mol %
and in which the concave-convex surface having height difference given to the air bearings of the slider is formed so that convex portions occupy the area percentage of 20 to 80 %. The concave-convex surface having height difference provided on the air bearings of the slider is constituted of a plurality of concave-convex surfaces defined by cliffs whose height is rapidly changed, and it is more preferable to form finer surface roughness on the plurality of concave-convex surfaces as compared with the cliffs in view of CSS characteristic. The nonmagnetic polycrystalline Mn—Zn ferrite used preferably has a Curie temperature Tc of less than or equal to 0° C., an average crystal particle size of less than or equal to 15 $\mu$m, a pore ratio of less than or equal to 0.2% and a coefficient of thermal expansion in a range of $(82-98) \times 10^{-7}/°C$.

To prepare the slider having such a configuration, a blank material is pre-treated, an electromagnetic transducer portion is produced, through lithographic thin-film techniques, on the pre-treated surface of the blank material and then a thin-film type magnetic head is produced by treating the electromagnetic transducer portion into the form of a magnetic head. The surface of the thus produced magnetic head facing the magnetic recording medium is processed by some means so as to provide concave-convex surface having height difference.

When the thin-film magnetic head 1 shown in FIG. 1 is in a normal stop posture, areas of the air bearing surfaces 11 except inclined portions 14 are in contact with the disk in a state of rest. In the present invention, all the areas except the inclined portions may be treated to provide suitable surface roughness, or the part of the area as in the figure may be treated to provide suitable surface roughness. From the point of view of CSS characteristic, however, it is preferable to treat all the area except the inclined portions. If the level difference between concave portions and convex portions is so small, the effect of concave-convex having height difference is diminished. Accordingly, it is preferable to select the level difference to be not smaller than 50 Å. Further, it is preferable to make the pitch between the concave portions and the convex portions irregular in a range of from 10 to 40 $\mu$m on an average so as to make the contact between the disk and the magnetic recording medium stable.

The reason why the proportion of components is limited is as follows. If the $Fe_2O_3$ content is less than 20 mol % or larger than 58 mol %, the MnO content is less than 4 mol % or ZnO content is larger than 46%, sintering characteristic is so bad that it is difficult to make the density high and it is apt to generate a different phase. If the MnO content is larger than 40 mol %, corrosion resistance is poor. If the ZnO content is less than 30 mol %, the Curie temperature exceeds 0° C. so that nonmagnetic characteristic cannot be obtained. The amounts of additives are limited because there is a tendency to increase abnormal particles in the case where the total amount is less than 0.02 wt % and because it is difficult to provide high density in the case where the total amount is larger than 7 wt %.

The Mn—Zn polycrystalline ferrite forming the slider of the thin-film magnetic head according to the present invention is nonmagnetic, so that there is little possibility of production of noise. The pore ratio is not larger than 0.2 %, so that the strength of the crystal particle boundary is high and, accordingly, there is little occurrence of chipping at the time of finish-polishing. The average crystal particle size is not larger than 15 $\mu$m, so that the pitch between concave portions and convex portions can be dispersed to a suitable range of 5 to 20 $\mu$m.

The CSS characteristic can be improved by giving suitable concave-convex surface having height difference to air bearing surfaces of the magnetic head being in contact with the magnetic disk to reduce the adhesion between the magnetic disk and the magnetic head.

The Vickers hardness is in a suitable range of from 600 to 700 kg/mm$^2$, so that the wear and tear of both the disk and the head caused by the contact therebetween can be diminished.

The thermal expansion coefficient is in a range of $(82-98) \times 10^{-7}/°C$. as approximated to the range of $(80-90) \times 10^{-7}/°C$. of $Al_2O_3$, so that the adhesion of $Al_2O_3$ is good and, accordingly, separation of the metal magnetic film is reduced.

DETAILED DESCRIPTION OF THE INVENTION

A slider was formed of nonmagnetic Mn—Zn polycrystalline ferrite containing 40 mol % of $Fe_2O_3$, 16 mol % of MnO and 44 mol % of ZnO. An $Al_2O_3$ film was formed at outflow-side end portions of the slider and an electromagnetic transducer portion is formed of a thin metal magnetic film. Then, finishing treatment was carried out to produce a thin-film magnetic head.

Figure 1:
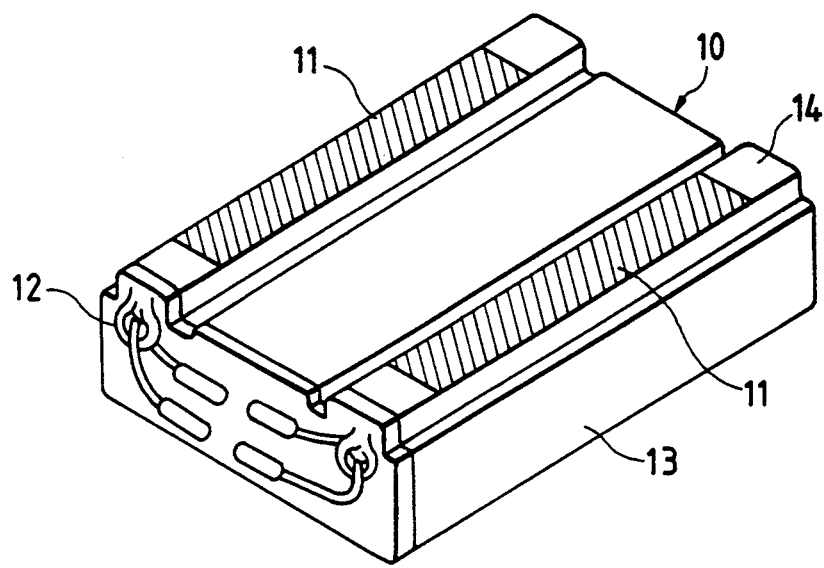
FIG. 1 is a perspective view of a thin-film magnetic head showing an embodiment of the present invention.
Figure 2:
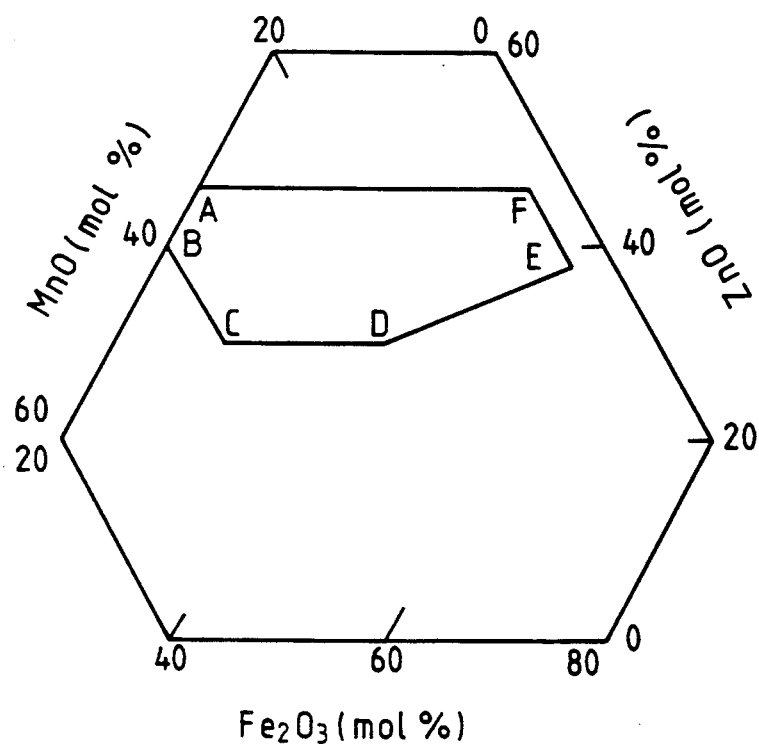
FIG. 2 is a view showing the proportion ranges of components contained in Mn—Zn polycrystalline ferrite which forms a slider in the thin-film magnetic head according to the present invention.

Concave-convex surface having height difference was formed, through sputter etching, in the surfaces of air bearings of the slider of the magnetic head facing the disk as shown in FIG. 1. The sputter etching is a technique for carrying out treatment by using a reverse sputtering state by a sputtering apparatus. In ordinary sputtering, Ar gas is ionized by application of a high voltage in an atmosphere of Ar gas having a predetermined gas pressure to thereby make Ar gas collide with a surface of a target to deposit target particles sputtered by the collision onto a substrate to form a film. On the contrary, in the sputter etching, ionized inert gas is made to collide with a surface of a magnetic head to thereby remove atoms from the surface of the head. The surface of the slider is gradually removed by the collision of the ionized gas to respective particles constituting the slider. Because there is a difference in bonding energy between the respective particles and there is a difference in energy required for removing the respective particles of the surface, a delicate level difference can be produced by such a removing process.

Further, at the time of sputter etching, removing of the phase deteriorated in the process and cleaning of the surface are carried out. At the time of sputter etching, unnecessary portions may be masked so that necessary portions can be selectively subjected to the sputter etching. It is to be understood that means for forming a concave-convex level difference is not always limited to the sputter etching but any means such as ion milling or chemical etching may be used.

Figure 3:
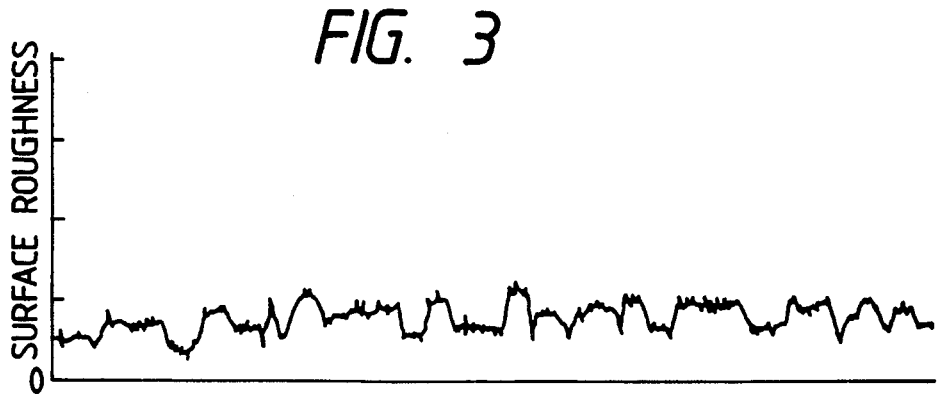
FIG. 3 is a view showing suitable surface roughness of concave-convex surface provided on an air bearing.
Figure 4:
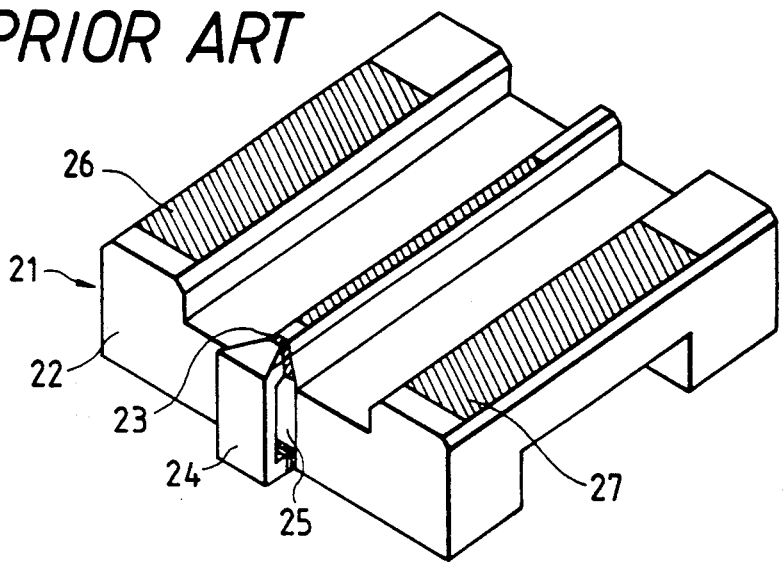
FIG. 4 is a perspective view showing a conventional monolithic type floatation magnetic head.
Figure 5:
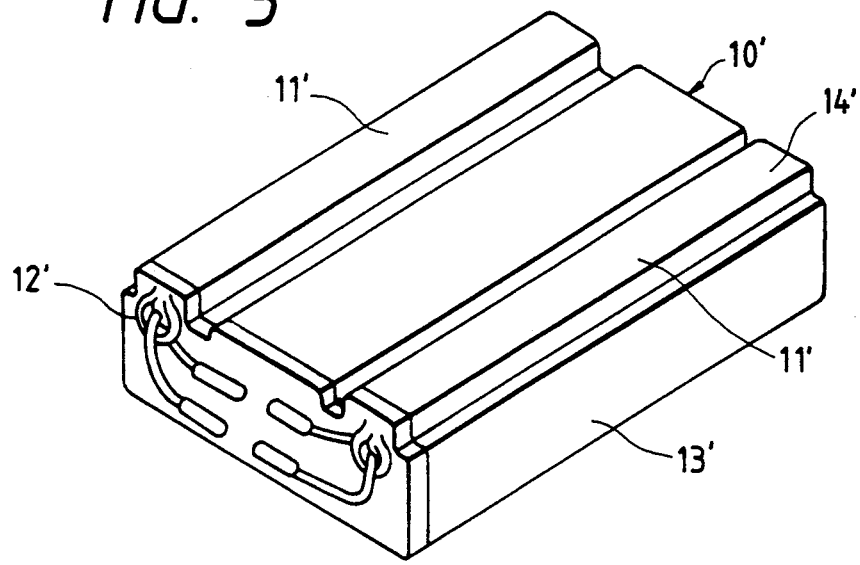
FIG. 5 is a perspective view showing the fundamental configuration of a conventional thin-film magnetic head.

When the sputter etching is carried out, as shown in FIG. 3, convex and concave appear alternately so that concave-convex surface having height difference which has portions (cliffs) where the height changes rapidly between the convex and the concave, is formed. The convex is a portion higher than a neighboring portion across the cliff. The cliff portions extend along the grain boundaries of polycrystals. Because the convex-concave surface has suitable level differences which are repeated at intervals of a suitable pitch, the phenomenon of sticking (adhesion) between the head and disk can be prevented or relieved. Further, it is considered that the CSS damage of the disk is prevented because the cliff portions extend along the grain boundaries. That is, because the cliff portions extend along the grain boundaries, the cliff portions have substantially the same property as the property of single crystals.

Further, when a plurality of concave-convex surfaces defined by the cliffs whose height is rapidly changed, are provided with finer surface roughness as compared with the cliffs, the surfaces become more preferable in view of CSS characteristic.

FIG. 3 shows an example of the suitable surface roughness of the concave-convex surfaces. It is considered that the suitable surface roughness of the convex portions accelerates the improvement of the CSS characteristic.

At the time of stopping (non-operation), only the convex portions of the bearing surfaces of the slider thus treated are brought into contact with the recording medium while the concave portions do not touch the magnetic recording medium. It is considered that generation of dust caused by wearing is reduced to thereby prevent the sticking phenomenon when the contact, start and stop (CSS) operations of the magnetic head and the magnetic recording medium are repeated because the cliff portions have the same property as that of single crystals.

Though moderate concave-convex level differences are formed in the air bearing surfaces 11 of the magnetic head 1 shown in FIG. 1, if the area of the concave portions is too large, the area where the head is in contact with the magnetic recording medium becomes large and sliding resistance (frictional resistance) at the time of CSS becomes large to give an influence on the lifetime of the device. Therefore, it is preferable to select the area percentage of the convex portions in the surface of concave-convex level difference portion to be smaller than 80%. If the area percentage of the convex portions is too small, landing stability at the time of stopping of the device is lowered so that there is a possibility of occurrence of sticking between the magnetic recording medium and the floatation magnetic head. Accordingly, it is preferable to select the area percentage of the convex portions to be larger than 20%.

A CSS characteristic test was carried out on the thin-film magnetic head in which suitable concave-convex level differences were formed on the air bearings through the reverse sputtering as described above.

The CSS characteristic test was carried out in the condition of the rotating speed of 9.4 m/sec by using a 3.5-inch hard disk (a substrate: aluminum, an undercoat layer: Cr, a magnetic film: Co-Cr-Ta sputter film) as the disk. Evaluation was carried out by measuring torque required for staring the rotation of the magnetic disk while pressing the magnetic head onto the magnetic disk in a state of rest by a force of about 9.5 g-f through a ginbal and then calculating the friction coefficient from the measured torque. It is preferable to select the friction coefficient to be not larger than 1.0, more preferably, not larger than 0.7.

The results of the test is shown in Table 1.

No. 1 and No. 2 show examples of the present invention in which the area percentages of the convex portions were 25% and 75%, respectively. No. 3 and No. 4 show comparative examples in which the area percentages of the convex portions were 17% and 85%, respectively. No. 5 shows the case where the same nonmagnetic Mn—Zn polycrystalline ferrite was used in the thin-film head but sputter etching was not carried out.

As shown in Table 1, in each of the No. 1 and No. 2 magnetic heads using the slider having the area percentage of the convex portions in a range of from 20 to 80%, the friction coefficient was not larger than 0.7 even in the case where the number of times of CSS operations exceeded 50,000. In each of the No. 3 and No. 4 magnetic heads respectively having the area percentages of the convex portions of 17% and 85%, the friction coefficient exceeded a preferred limit of 0.7 in the case where the number of times of CSS operations was 50,000. In the No. 5 not-treated magnetic head, the friction coefficient was the same in level as in the examples of the present invention till the number of times of CSS operations reached about 1000, but it increased so rapidly when the number of times of CSS operations reached about 5000 and, further, it reached 1.0 when the number of times of CSS operations reached 10,000 so that the head could not be used in the magnetic disk device any more.

It is apparent from above description that the concave-convex level differences contribute to the improvement of CSS characteristic and that the area percentage of the convex portions in a range of from 20 to 80% is particularly effective.

TABLE 1

| No. | | The number of times of CSS operations | | | | | |
|---|---|---|---|---|---|---|---|
| | | 10 | 100 | 1000 | 5000 | 10000 | 50000 |
| 1 | No. 1 | 0.23 | 0.26 | 0.32 | 0.38 | 0.46 | 0.55 |
| 2 | No. 2 | 0.26 | 0.34 | 0.38 | 0.42 | 0.50 | 0.62 |
| 3 | No. 3 | 0.26 | 0.30 | 0.38 | 0.44 | 0.68 | 0.85 |
| 4 | No. 4 | 0.30 | 0.32 | 0.36 | 0.60 | 0.78 | 0.95 |
| 5 | No. 5 | 0.28 | 0.32 | 0.40 | 0.83 | 1.0 | — |

According to the present invention, the CSS characteristic which has been one of the major problems in the thin-film magnetic head in the prior art can be improved greatly because a slider is formed of nonmagnetic Mn—Zn polycrystalline ferrite, and concave-convex level differences are formed in air bearing surfaces of a magnetic head facing a magnetic recording medium while the area percentage of the convex portions of the concave-convex level difference portion is selected to be in a range of from 20 to 80%.

What is claimed is:

1. A thin film magnetic head comprising a slider and an air bearing at a floating side of said slider, said slider being formed of nonmagnetic polycrystalline Mn—Zn ferrite of a composition in a range defined by A-B-C-D-E-F A ($Fe_2O_3$: 20, MnO: 34, ZnO: 46)
B ($Fe_2O_3$L 20, MnO: 40, ZnO: 40 )
C ($Fe_2O_3$: 30, MnO: 40, ZnO: 30)
D ($Fe_2O_3$: 45, MnO: 25, ZnO: 30)
E ($Fe_2O_3$: 58, MnO: 4, ZnO: 38)
F ($Fe_2O_3$: 50, MnO: 4, ZnO: 46) by mol % and containing from 0.02 to 7 wt % of at least one member selected from the group consisting of CaO, MgO, $ZrO_2$, $SnO_2$, $Al_2O_3$, SrO and NiO, said bearing being provided with concave-convex surface, and said concave-convex surface being formed so that convex portions occupy the area percentage in a range of 20 to 80%

2. A thin-film magnetic head as claimed in claim 1, wherein said concave-convex surface is constituted of a plurality of concave-convex surfaces defined by cliffs whose height is rapidly changed, and the plurality of concave-convex surfaces are provided with surface roughness finer than said cliffs.

3. A thin-film magnetic head as claimed in claim 1 or 2, wherein said nonmagnetic polycrystalline Mn—Zn ferrite has a Curie temperature Tc of not higher than 0° C., an average crystal particle size of not larger than 15 $\mu$m, a pore ratio of not larger than 0.2% and a coefficient of thermal expansion in a range of $82-98 \times 10^{-7}$/°C.

* * * * *

UNITED STATES PATENT AND TRADEMARK OFFICE
CERTIFICATE OF CORRECTION

PATENT NO. : 5,323,282
DATED : June 21, 1994
INVENTOR(S) : Kunio KANAI et al.

It is certified that error appears in the above-indentified patent and that said Letters Patent is hereby corrected as shown below:

TITLE PAGE, Col. 1, after Section [22] insert the following:

--[30] Foreign Application Priority Data

Jan. 9, 1992 [JP] ..................4-000317--.

Column 7, line 5, (claim 1) delete "L", and insert --:--.

Signed and Sealed this

Twenty-second Day of August, 1995

Attest:

BRUCE LEHMAN

*Attesting Officer*  *Commissioner of Patents and Trademarks*